(12) United States Patent
Whitney et al.

(10) Patent No.: US 10,273,900 B2
(45) Date of Patent: Apr. 30, 2019

(54) METHOD TO DETERMINE REFERENCE AIRFLOW ACTUATOR POSITIONS FOR A GASOLINE ENGINE

(71) Applicant: GM Global Technology Operations LLC, Detroit, MI (US)

(72) Inventors: Christopher E. Whitney, Commerce, MI (US); David N. Hayden, Ortonville, MI (US); Gary Robert Cygan, Jr., Auburn Hills, MI (US); Stephen P. Levijoki, Swartz Creek, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 212 days.

(21) Appl. No.: 15/421,547

(22) Filed: Feb. 1, 2017

(65) Prior Publication Data

US 2018/0216563 A1    Aug. 2, 2018

(51) Int. Cl.

| | |
|---|---|
| *F02D 41/24* | (2006.01) |
| *F02B 37/18* | (2006.01) |
| *F02D 41/00* | (2006.01) |
| *F02D 41/14* | (2006.01) |
| *F02D 43/04* | (2006.01) |
| *F02P 5/04* | (2006.01) |
| *F02D 11/10* | (2006.01) |

(Continued)

(52) U.S. Cl.
CPC ........ *F02D 41/2464* (2013.01); *F02B 37/183* (2013.01); *F02D 11/105* (2013.01); *F02D 37/02* (2013.01); *F02D 41/0077* (2013.01); *F02D 41/1401* (2013.01); *F02D 41/2422* (2013.01); *F02D 43/04* (2013.01); *F02P 5/045* (2013.01); *F02P 5/1504* (2013.01); *H01T 13/00* (2013.01); *F02D 41/1406* (2013.01); *F02D 2041/001* (2013.01); *F02D 2041/1432* (2013.01); *F02D 2041/1433* (2013.01); *F02D 2041/1434* (2013.01); *F02D 2200/1006* (2013.01); *F02D 2250/18* (2013.01); *F02P 5/1506* (2013.01); *F02P 5/1516* (2013.01); *Y02T 10/144* (2013.01)

(58) Field of Classification Search
CPC .... F02D 41/2464; F02D 11/105; F02D 37/02; F02D 41/2422; F02D 41/1401; F02D 41/0077; F02D 43/04; F02D 2250/18; F02D 2041/001; F02D 41/1406; F02D 2200/1006; F02D 2041/01; F02P 5/045; F02B 37/183

See application file for complete search history.

(56) References Cited

U.S. PATENT DOCUMENTS

| | | | |
|---|---|---|---|
| 7,614,384 B2 * | 11/2009 | Livshiz | F02D 11/105 123/399 |
| 8,473,179 B2 | 6/2013 | Whitney et al. | |

(Continued)

*Primary Examiner* — Freddie Kirkland, III

(57) ABSTRACT

A method to determine reference actuator positions for a gasoline engine, includes entering a base torque request, a known spark advance, a known CAM position and a known exhaust gas recirculation (EGR) valve position into an inverse torque model to generate a first iteration desired air per cylinder (APC) value. The first iteration desired APC value is passed through a deadband filter to produce a filtered first iteration desired APC signal. A Predicted As Cal (PAC) spark advance is calculated for the filtered first iteration desired APC value. The PAC spark advance and the base torque request are modified, and data from a first lookup table is entered to generate a second iteration desired APC value.

18 Claims, 3 Drawing Sheets

(51) Int. Cl.
*F02D 37/02* (2006.01)
*H01T 13/00* (2006.01)
*F02P 5/15* (2006.01)

(56) References Cited

U.S. PATENT DOCUMENTS

| | | | | |
|---|---|---|---|---|
| 8,594,904 | B2* | 11/2013 | Livshiz | F02P 5/1504 |
| | | | | 701/102 |
| 9,376,965 | B2* | 6/2016 | Whitney | F02D 41/221 |
| 9,388,754 | B2* | 7/2016 | Cygan, Jr. | B60W 10/06 |
| 9,429,085 | B2* | 8/2016 | Whitney | F02D 41/0002 |
| 9,534,547 | B2* | 1/2017 | Livshiz | F02D 13/0219 |
| 9,765,703 | B2* | 9/2017 | Whitney | F02D 11/105 |
| 9,797,318 | B2* | 10/2017 | Storch | F02D 28/00 |
| 9,920,697 | B2* | 3/2018 | Pochner | F02D 9/02 |
| 2009/0118968 | A1* | 5/2009 | Livshiz | F02D 11/105 |
| | | | | 701/102 |
| 2015/0275771 | A1* | 10/2015 | Pochner | F02D 9/02 |
| | | | | 701/103 |
| 2015/0275784 | A1* | 10/2015 | Whitney | F02D 13/02 |
| | | | | 701/102 |
| 2015/0279124 | A1* | 10/2015 | Wong | G07C 5/00 |
| | | | | 701/99 |
| 2018/0298838 | A1* | 10/2018 | Pisu | F02D 41/1402 |

* cited by examiner

METHOD TO DETERMINE REFERENCE AIRFLOW ACTUATOR POSITIONS FOR A GASOLINE ENGINE

INTRODUCTION

The present disclosure relates to internal combustion engines and more particularly to systems and methods to control actuator positions to achieve a desired torque.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. Spark timing and air flow are the primary mechanisms for adjusting a torque output of spark-ignition engines. Engine control systems have been developed to control engine output torque to achieve a desired torque. Traditional engine control systems, however, induce significant time delay during translation of the accelerator pedal travel into a desired axle or engine torque, and therefore do not control the engine output torque as accurately as desired. When going from a desired predicted torque to a desired air per cylinder, hereinafter "APC", known systems use the current spark. A drawback to this approach is that during a transient the current spark is not the same as the spark will be at the end of the transient. Therefore, the desired APC will not be correct until the system settles down. Such systems therefore solve for the desired APC iteratively as the system moves toward a setpoint. This solution, however, can make the system slow or oscillatory.

Thus, while current engine control systems achieve their intended purpose, there is a need for a new and improved system and method for translating accelerator pedal travel to a desired axle or engine torque.

SUMMARY

According to several aspects, a method to determine reference actuator positions for a gasoline engine, includes: entering a base torque request into an inverse torque model to generate a first iteration desired air per cylinder (APC) value; calculating a Predicted As Cal (PAC) spark advance for the first iteration desired APC value; modifying the first iteration desired APC value to generate a second iteration desired APC value by entering the PAC spark advance, the base torque request, and data from at least one lookup table into the inverse torque model; and determining at least one actuator reference position using data from a second lookup table and the second iteration desired APC value.

According to several aspects, the method further includes adding during the entering step a known spark advance.

According to several aspects, the method further includes adding during the entering step a known CAM position.

According to several aspects, the method further includes adding during the entering step a known exhaust gas recirculation (EGR) valve position.

According to several aspects, the method further includes limiting the CAM position and the EGR valve position using constraint data from at least one constraint lookup table defining a constrained CAM position and a constrained EGR valve position.

According to several aspects, the method further includes passing the constrained CAM position and the constrained EGR valve position through at least one first order lag filter to produce a filtered first iteration CAMS and EGR signal.

According to several aspects, the method further includes generating the base torque request prior to the entering step including adding an air conditioner load and a generator load to a predicted torque request.

According to several aspects, the method further includes determining a first iteration desired CAM position and a first iteration desired EGR valve position prior to calculating the Predicted As Cal (PAC) spark advance.

According to several aspects, the method further includes passing the first iteration desired APC value through a deadband filter to produce a filtered first iteration desired APC signal.

According to several aspects, the method further includes passing the second iteration desired APC value through each of: a CAM and EGR lookup table; a wastegate lookup table; and a throttle lookup table.

According to several aspects, a method to determine reference actuator positions for a gasoline engine, includes: entering a base torque request, a known spark advance, a known CAM position and a known exhaust gas recirculation (EGR) valve position into an inverse torque model to generate a first iteration desired air per cylinder (APC) value; passing the first iteration desired APC value through a deadband filter to produce a filtered first iteration desired APC signal; calculating a Predicted As Cal (PAC) spark advance for the filtered first iteration desired APC value; and modifying the PAC spark advance and the base torque request, and entering data from a first lookup table to generate a second iteration desired APC value.

According to several aspects, the method further includes modifying the filtered first iteration desired APC signal with data in a CAM and EGR lookup table.

According to several aspects, the method further includes further modifying the filtered first iteration desired APC signal with data from at least one constraint lookup table defining a modified filtered first iteration desired APC signal.

According to several aspects, the method further includes sending the modified filtered first iteration desired APC signal through at least one first order lag filter to produce a filtered first iteration CAMS and EGR signal.

According to several aspects, the method further includes passing the filtered first iteration CAMS and EGR signal and the base torque request through the inverse torque model to produce a desired APC second iteration signal.

According to several aspects, the method further includes modifying the desired APC second iteration signal with data from at least one CAM and EGR lookup table to create each of: a reference intake cam position signal; a reference exhaust cam position signal; and a reference EGR position signal.

According to several aspects, the method further includes modifying the desired APC second iteration signal with data from at least one wastegate lookup table to create a reference wastegate position.

According to several aspects, the method further includes modifying the desired APC second iteration signal with data from at least one throttle lookup table to create a reference throttle position.

According to several aspects, the method further includes entering a second lookup table using the second iteration desired APC value to determine at least one actuator reference position.

According to several aspects, a method for determining reference airflow actuator positions for a gasoline engine, includes: entering a base torque request, a known spark advance, a known CAM position and a known exhaust gas recirculation (EGR) valve position into an inverse torque model to generate a first iteration desired air per cylinder value; determining a first iteration desired CAM position and a first iteration desired EGR valve position for the first iteration desired air per cylinder value in a first lookup table; calculating a Predicted As Cal (PAC) spark advance from the first iteration desired CAM position and the first iteration desired EGR valve position; passing the PAC spark advance, the base torque request, and the first iteration desired EGR valve position through the inverse torque model to generate a second iteration desired air per cylinder value; and modifying the second iteration desired air per cylinder value using data from a second lookup table to generate an actuator reference position.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
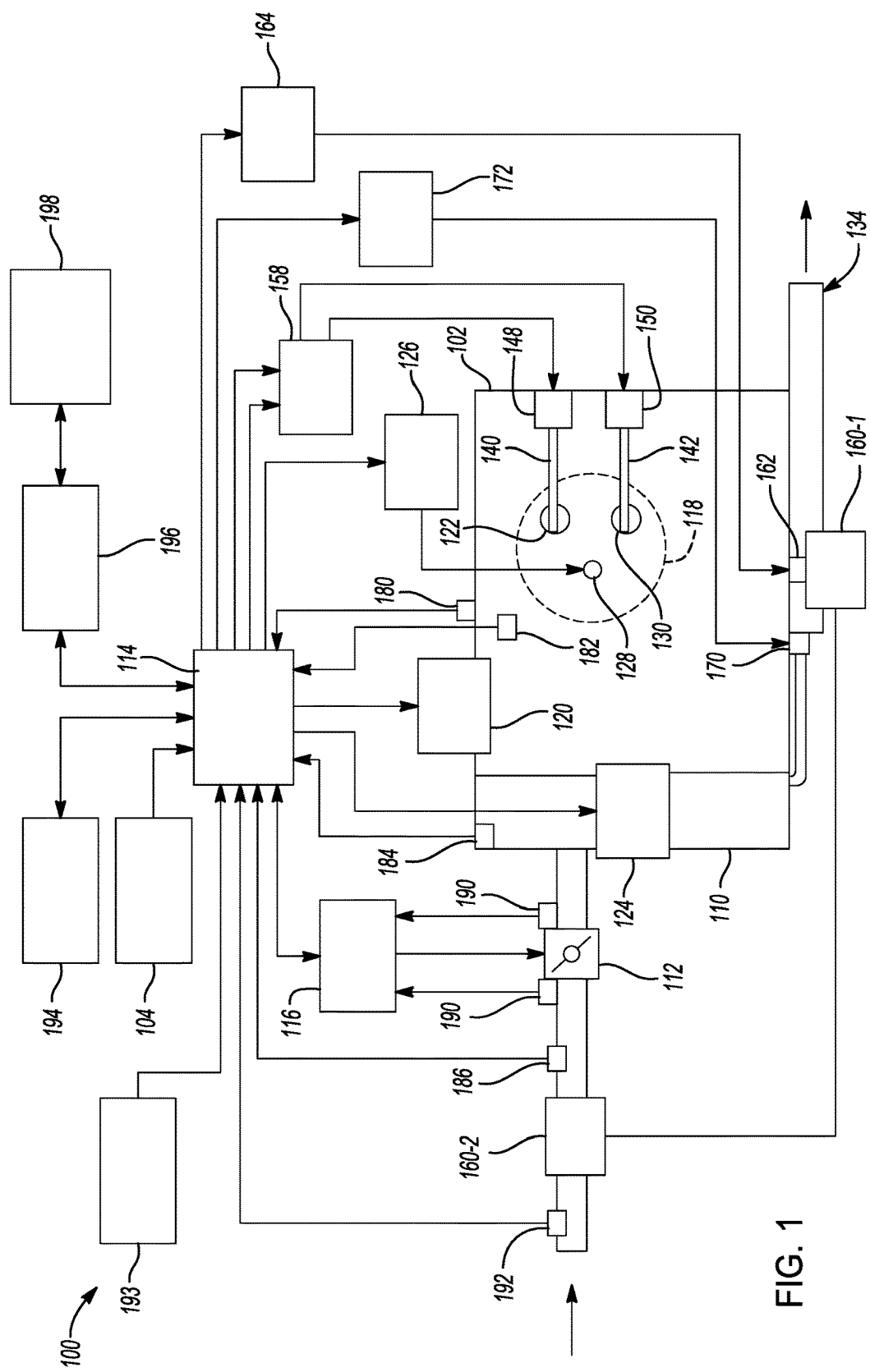
FIG. 1 is a functional block diagram of an exemplary engine system according to an exemplary embodiment.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An engine control module (ECM) may selectively operate an engine in one or more increased fuel economy (FE) modes. For example only, the ECM may operate an engine in a cylinder deactivation mode and/or in a low-lift mode. The ECM may deactivate one or more cylinders during operation in the cylinder deactivation mode. During operation in the low-lift mode, a camshaft may open an associated valve of a cylinder to a lesser extent and/or for a lesser period than during operation in another lift mode (e.g., a high-lift mode). Generally, the maximum torque that the engine can produce during operation in an FE mode is limited, but FE is increased.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The engine 102 may be a gasoline spark ignition internal combustion engine.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a turbocharger that includes a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172 based on signals from the ECM 114.

A position of the crankshaft may be measured using a crankshaft position sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The engine system 100 may also include one or more other sensors 193, such as an ambient humidity sensor, one or more knock sensors, a compressor outlet pressure sensor and/or a throttle inlet pressure sensor, a wastegate position sensor, an EGR position sensor, and/or one or more other suitable sensors. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The phaser actuator module 158 may control the intake and exhaust cam phasers 148 and 150 to achieve target intake and exhaust cam phaser angles, respectively. The EGR actuator module 172 may control the EGR valve 170 to achieve a target EGR opening area. The boost actuator module 164 controls the wastegate 162 to achieve a target wastegate opening area. The cylinder actuator module 120 controls cylinder deactivation to achieve a target number of activated or deactivated cylinders.

The ECM 114 generates the target values for the engine actuators to cause the engine 102 to generate a target engine output torque. The ECM 114 generates the target values for the engine actuators using model predictive control, as discussed further below.

Figure 2:
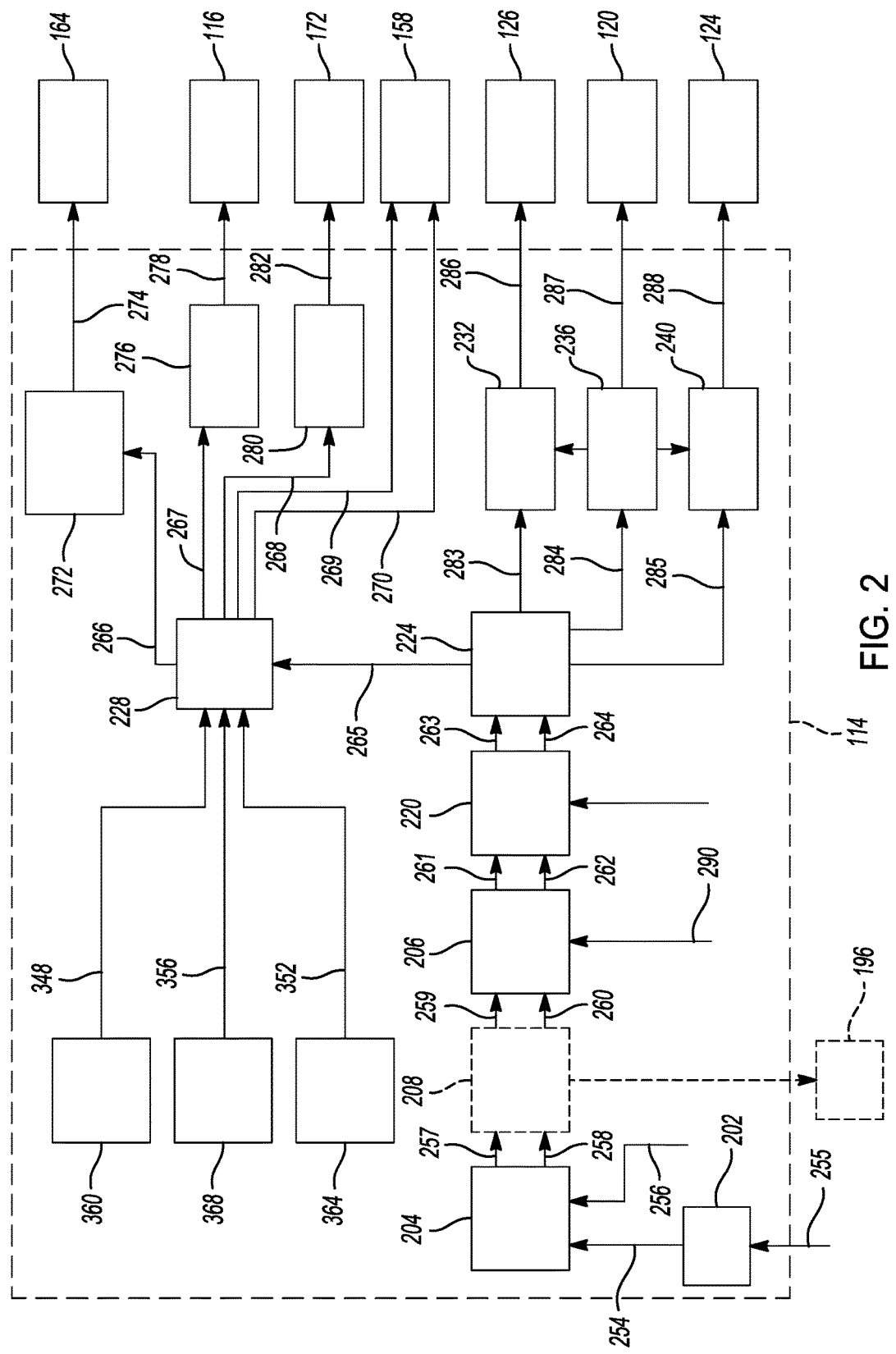
FIG. 2 is a functional block diagram of an exemplary engine control system according to an exemplary embodiment.

Referring now to FIG. 2, a functional block diagram of an example engine control system is presented. An example implementation of the ECM 114 includes a driver torque module 202, an axle torque arbitration module 204, and a propulsion torque arbitration module 206. The ECM 114 may include a hybrid optimization module 208. The ECM 114 also includes a reserves/loads module 220, a torque requesting module 224, an air control module 228, a spark control module 232, a cylinder control module 236, and a fuel control module 240.

The driver torque module 202 may determine a driver torque request 254 based on a driver input 255 from the driver input module 104. The driver input 255 may be based on, for example, a position of an accelerator pedal and a position of a brake pedal. The driver input 255 may also be based on cruise control, which may be an adaptive cruise control system that varies vehicle speed to maintain a predetermined following distance. The driver torque module 202 may store one or more mappings of accelerator pedal position to target torque and may determine the driver torque request 254 based on a selected one of the mappings.

An axle torque arbitration module 204 arbitrates between the driver torque request 254 and other axle torque requests 256. Axle torque (torque at the wheels) may be produced by various sources including an engine and/or an electric motor. For example, the axle torque requests 256 may include a torque reduction requested by a traction control system when positive wheel slip is detected. Positive wheel slip occurs when axle torque overcomes friction between the wheels and the road surface, and the wheels begin to slip against the road surface. The axle torque requests 256 may also include a torque increase request to counteract negative wheel slip, where a tire of the vehicle slips in the other direction with respect to the road surface because the axle torque is negative.

The axle torque requests 256 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 256 may also be generated by vehicle stability control systems.

The axle torque arbitration module 204 outputs a predicted torque request 257 and an immediate torque request 258 based on the results of arbitrating between the received torque requests 254 and 256. As described below, the predicted and immediate torque requests 257 and 258 from the axle torque arbitration module 204 may selectively be adjusted by other modules of the ECM 114 before being used to control the engine actuators.

In general terms, the immediate torque request 258 may be an amount of currently desired axle torque, while the predicted torque request 257 may be an amount of axle torque that may be needed on short notice. The ECM 114 controls the engine system 100 to produce an axle torque equal to the immediate torque request 258. However, different combinations of target values may result in the same axle torque. The ECM 114 may therefore adjust the target values to enable a faster transition to the predicted torque request 257, while still maintaining the axle torque at the immediate torque request 258.

In various implementations, the predicted torque request 257 may be set based on the driver torque request 254. The immediate torque request 258 may be set to less than the predicted torque request 257 under some circumstances, such as when the driver torque request 254 is causing wheel slip on an icy surface. In such a case, a traction control system (not shown) may request a reduction via the immediate torque request 258, and the ECM 114 reduces the engine torque output to the immediate torque request 258. However, the ECM 114 performs the reduction so the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque with minimal delay. Fast engine actuators are defined in contrast with slow engine actuators.

In general terms, fast engine actuators can change the axle torque more quickly than slow engine actuators. Slow actuators may respond more slowly to changes in their respective target values than fast actuators do. For example, a slow actuator may include mechanical components that require time to move from one position to another in response to a change in target value. A slow actuator may also be characterized by the amount of time it takes for the axle torque to begin to change once the slow actuator begins to implement the changed target value. Generally, this amount of time will be longer for slow actuators than for fast actuators. In addition, even after beginning to change, the axle torque may take longer to fully respond to a change in a slow actuator.

For example only, the spark actuator module 126 may be a fast actuator. Spark-ignition engines may combust fuels including, for example, gasoline and ethanol, by applying a spark. By way of contrast, the throttle actuator module 116 may be a slow actuator.

For example, as described above, the spark actuator module 126 can vary the spark timing for a next firing event when the spark timing is changed between a last firing event and the next firing event. By way of contrast, changes in throttle opening take longer to affect engine output torque. The throttle actuator module 116 changes the throttle opening by adjusting the angle of the blade of the throttle valve 112. Therefore, when the target value for opening of the throttle valve 112 is changed, there is a mechanical delay as the throttle valve 112 moves from its previous position to a new position in response to the change. In addition, air flow changes based on the throttle opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening to a value that would allow the engine 102 to produce the predicted torque request 257. Meanwhile, the spark timing can be set based on the immediate torque request 258, which is less than the predicted torque request 257. Although the throttle opening generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark timing to an optimum value, which allows the engine 102 to produce the full engine output torque achievable with the air flow already present. The engine output torque may therefore be quickly increased to the predicted torque request 257 without experiencing delays from changing the throttle opening.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 290, including the converted predicted and immediate torque requests. The propulsion torque arbitration module 206 generates an arbitrated predicted torque request 261 and an arbitrated immediate torque request 262. The arbitrated torque requests 261 and 262 may be generated by selecting a winning request from among received torque requests. Alternatively or additionally, the arbitrated torque requests may be generated by modifying one of the received requests based on another one or more of the received torque requests.

For example, the propulsion torque requests 290 may include torque reductions for engine over-speed protection, torque increases for stall prevention, and torque reductions requested by the transmission control module 194 to accommodate gear shifts. The propulsion torque requests 290 may also result from clutch fuel cutoff, which reduces the engine output torque when the driver depresses the clutch pedal in a manual transmission vehicle to prevent a flare in engine speed.

The propulsion torque requests 290 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 261 and 262.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the torque requesting module 224.

For example only, a catalyst light-off process or a cold start emissions reduction process may require retarded spark timing. The reserves/loads module 220 may therefore increase the adjusted predicted torque request 263 above the adjusted immediate torque request 264 to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request 263 while leaving the adjusted immediate torque request 264 unchanged to produce the torque reserve. Then, when the A/C compressor clutch engages, the reserves/loads module 220 may increase the adjusted immediate torque request 264 by the estimated load of the A/C compressor clutch.

The torque requesting module 224 receives the adjusted predicted and immediate torque requests 263 and 264. The torque requesting module 224 determines how the adjusted predicted and immediate torque requests 263 and 264 will be achieved. The torque requesting module 224 may be engine type specific. For example, the torque requesting module 224 may be implemented differently or use different control schemes for spark-ignition engines versus compression-ignition engines.

In various implementations, the torque requesting module 224 may define a boundary between modules that are common across all engine types and modules that are engine type specific. For example, engine types may include spark-ignition and compression-ignition. Modules prior to the torque requesting module 224, such as the propulsion torque arbitration module 206, may be common across engine types, while the torque requesting module 224 and subsequent modules may be engine type specific.

The torque requesting module 224 determines an air torque request 265 based on the adjusted predicted and immediate torque requests 263 and 264. The air torque request 265 may be a brake torque. Brake torque may refer to torque at the crankshaft under the current operating conditions.

Target values for airflow controlling engine actuators are determined based on the air torque request 265. More specifically, based on the air torque request 265, the air control module 228 determines a target wastegate opening area 266, a target throttle opening area 267, a target EGR opening area 268, a target intake cam phaser angle 269, and a target exhaust cam phaser angle 270. The air control module 228 determines the target wastegate opening area 266, the target throttle opening area 267, the target EGR opening area 268, the target intake cam phaser angle 269, and the target exhaust cam phaser angle 270 using model predictive control, as discussed further below.

The boost actuator module 164 controls the wastegate 162 to achieve the target wastegate opening area 266. For example, a first conversion module 272 may convert the target wastegate opening area 266 into a target duty cycle 274 to be applied to the wastegate 162, and the boost actuator module 164 may apply a signal to the wastegate 162 based on the target duty cycle 274. In various implementations, the first conversion module 272 may convert the target wastegate opening area 266 into a target wastegate position (not shown), and convert the target wastegate position into the target duty cycle 274.

The throttle actuator module 116 controls the throttle valve 112 to achieve the target throttle opening area 267. For example, a second conversion module 276 may convert the target throttle opening area 267 into a target duty cycle 278 to be applied to the throttle valve 112, and the throttle actuator module 116 may apply a signal to the throttle valve 112 based on the target duty cycle 278. In various implementations, the second conversion module 276 may convert the target throttle opening area 267 into a target throttle position (not shown), and convert the target throttle position into the target duty cycle 278.

The EGR actuator module 172 controls the EGR valve 170 to achieve the target EGR opening area 268. For example, a third conversion module 280 may convert the target EGR opening area 268 into a target duty cycle 282 to be applied to the EGR valve 170, and the EGR actuator module 172 may apply a signal to the EGR valve 170 based on the target duty cycle 282. In various implementations, the third conversion module 280 may convert the target EGR opening area 268 into a target EGR position (not shown), and convert the target EGR position into the target duty cycle 282.

The phaser actuator module 158 controls the intake cam phaser 148 to achieve the target intake cam phaser angle 269. The phaser actuator module 158 also controls the exhaust cam phaser 150 to achieve the target exhaust cam phaser angle 270. In various implementations, a fourth conversion module (not shown) may be included and may convert the target intake and exhaust cam phaser angles into target intake and exhaust duty cycles, respectively. The phaser actuator module 158 may apply the target intake and exhaust duty cycles to the intake and exhaust cam phasers 148 and 150, respectively. In various implementations, the air control module 228 may determine a target overlap factor and a target effective displacement, and the phaser actuator module 158 may control the intake and exhaust cam phasers 148 and 150 to achieve the target overlap factor and the target effective displacement.

The torque requesting module 224 may also generate a spark torque request 283, a cylinder shut-off torque request 284, and a fuel torque request 285 based on the predicted and immediate torque requests 263 and 264. The spark control module 232 may determine how much to retard the spark timing (which reduces engine output torque) from an optimum spark timing based on the spark torque request 283. For example only, a torque relationship may be inverted to solve for a target spark timing 286. For a given torque request ($T_{Req}$), the target spark timing ($S_T$) 286 may be determined based on:

$$S_T = f^{-1}(T_{Req}, APC, I, E, AF, OT, \#), \quad (1)$$

where APC is an APC, I is an intake valve phasing value, E is an exhaust valve phasing value, AF is an air/fuel ratio, OT is an oil temperature, and # is a number of activated cylinders. This relationship may be embodied as an equation and/or as a lookup table. The air/fuel ratio (AF) may be the actual air/fuel ratio, as reported by the fuel control module 240.

When the spark timing is set to the optimum spark timing, the resulting torque may be as close to a maximum best torque (MBT) as possible. MBT refers to the maximum engine output torque that is generated for a given air flow as spark timing is advanced, while using fuel having an octane rating greater than a predetermined octane rating and using stoichiometric fueling. The spark timing at which this maximum torque occurs is referred to as an MBT spark timing. The optimum spark timing may differ slightly from MBT spark timing because of, for example, fuel quality (such as when lower octane fuel is used) and environmental factors, such as ambient humidity and temperature. The engine output torque at the optimum spark timing may therefore be less than MBT. For example only, a table of optimum spark timings corresponding to different engine operating conditions may be determined during a calibration phase of vehicle design, and the optimum value is determined from the table based on current engine operating conditions.

The cylinder shut-off torque request 284 may be used by the cylinder control module 236 to determine a target number of cylinders to deactivate 287. In various implementations, a target number of cylinders to activate may be used. The cylinder actuator module 120 selectively activates and deactivates the valves of cylinders based on the target number 287.

The cylinder control module 236 may also instruct the fuel control module 240 to stop providing fuel for deactivated cylinders and may instruct the spark control module 232 to stop providing spark for deactivated cylinders. The spark control module 232 may stop providing spark to a cylinder once an fuel/air mixture that is already present in the cylinder has been combusted.

The fuel control module 240 may vary the amount of fuel provided to each cylinder based on the fuel torque request 285. More specifically, the fuel control module 240 may generate target fueling parameters 288 based on the fuel torque request 285. The target fueling parameters 288 may include, for example, target mass of fuel, target injection starting timing, and target number of fuel injections.

During normal operation, the fuel control module 240 may operate in an air lead mode in which the fuel control module 240 attempts to maintain a stoichiometric air/fuel ratio by controlling fueling based on air flow. For example, the fuel control module 240 may determine a target fuel mass that will yield stoichiometric combustion when combined with a present mass of air per cylinder (APC).

Figure 3:
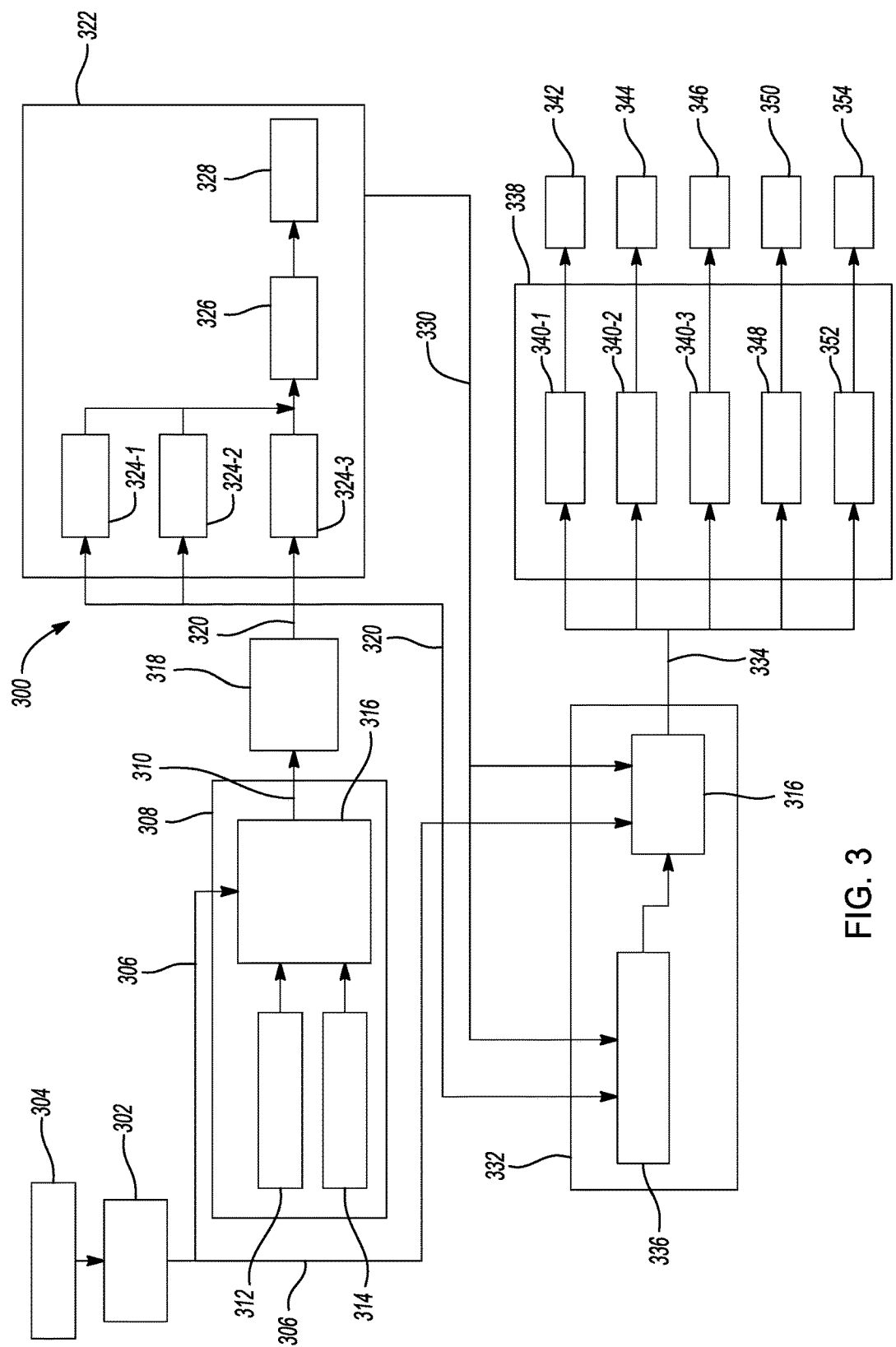
FIG. 3 is a functional block diagram defining components and process steps for determining first and second iterative air per cylinder values and reference actuator positions according to an exemplary embodiment.

Referring to FIG. 3, a functional block diagram 300 of the steps of the present disclosure to perform the method for determining reference airflow actuator positions using the relationship between a predicted torque request and the airflow actuators (throttle, CAM phasing, EGR and wastegate) is presented. The relationship between the predicted torque request and the airflow actuators is effected by spark efficiency and pumping losses. Torque is proportional to the Air Per Cylinder (APC). However, this relationship is strongly a function of the spark efficiency. With respect to spark efficiency, the actuator positions that are chosen are strongly correlated to the APC that is required. Therefore, the translation from torque to airflow actuator operation is a function of the spark efficiency. The spark efficiency can be effected by ambient temperature, fuel quality, humidity, and internal or external residuals. In addition, airflow must be increased to compensate for losses in spark efficiency due to knock.

The torque that is needed by the driver is defined as brake torque. Brake torque is equal to indicated torque (torque from combustion) subtracting: pumping losses, friction and accessory losses. When selecting airflow actuator positions, the CAM phasing, EGR and wastegate actuators affect pumping losses. Therefore, pumping losses are included in the translation from desired predicted torque (brake torque) to airflow actuator positions. However, a system that translates directly from the predicted torque request to the actuator positions is not able to handle the effects from spark retard.

According to the present disclosure, to incorporate spark retard into the torque model the best process identified by dyno testing is to include tables of throttle, intake CAM phasing, exhaust CAM phasing, and wastegate 162 position as a function of desired APC, RPM and Mode. The mode can be catalyst light off, active fuel management, or any other mode that changes the relationship between desired APC and the most efficiency airflow actuator position.

With continuing reference to FIG. 3, according to several aspects, the following define the primary steps to translate from a predicted torque request to efficient actuator positions. In a first step 302, a predicted torque request 304 is converted to torque model units. The output of the first conversion step 302 is defined as a "Base Torque" or base torque request 306. According to several aspects the torque model is measured on a dyno machine with a short belt and a warm engine. To this may be added cold friction, A/C loads and generator loads.

In a second step 308, the base torque request 306 is translated to a first iteration desired APC value 310. The goal of calculating the first iteration desired APC value 310 is to get "close" to or approximate a final desired APC value. This translation includes a known last time loop's execution of the desired CAM and EGR positions 312 and a known last time loop's predicted spark advance 314 which are both passed through an inverse torque model 316. The first iteration desired APC value 310 does not produce a final desired APC because of the use of the last time loop's information. It is also noted that the first iteration desired APC value 310 is passed through a deadband filter 318 which reduces system oscillations prior to use by the following subsystems and produces a filtered first iteration desired APC 320 signal.

In a third step 322, the most efficient or desired CAM positions and EGR position are determined using the filtered first iteration desired APC 320 signal. The filtered first iteration desired APC 320 signal is used to enter an ICAM lookup table 324-1, an ECAM lookup table 324-2 and an EGR lookup table 324-3 based on mode to determine a first iteration UrIMOP and a first iteration UrEMOP. The ICAM lookup table 324-1, the ECAM lookup table 324-2 and the EGR lookup table 324-3 are predefined schedules that may be dependent on engine RPM, desired APC, mode, temperature, ambient pressure, and the like. This will identify the pumping losses to help solve the relationship between torque and desired APC. It is also noted this system can also limit the CAM positions and EGR valve positions using data from one or more system constraint lookup tables 326 to create a constrained CAM position and a constrained EGR valve position. The constraint lookup tables 326 may for example incorporate combustion quality. The data from the ICAM lookup table 324-1, the ECAM lookup table 324-2 and the EGR lookup table 324-3 incorporating the constrained CAM position and the constrained EGR valve position using the data from the constraint lookup tables 326 are passed through first order lag filters 328 to produce a filtered first iteration CAMS and EGR signal 330.

In a fourth step 332, a spark efficiency is determined for use in translating from torque to a desired second iteration APC 334 signal. The filtered first iteration desired APC 320 signal and the filtered first iteration CAMS and EGR signal 330 from the first iteration desired APC value 310 are passed to the spark system. The fourth step 332 is performed to calculate what a Predicted As Cal Spark (PACS) 336 would be at the end of the transient or event instead of waiting for the transient to end. The calculation of the predicted Predicted As Cal Spark (PACS) 336 may also include knock limitations.

The Predicted As Cal Spark PACS 336, together with the base torque request 306 and the desired ICAM and the desired ECAM as the filtered first iteration CAMS and EGR signal 330 from the first iteration desired APC value 310 are together passed into the inverse torque model 316 to generate the desired second iteration APC 334 signal. The desired second iteration APC 334 signal provides an accurate determination of the final desired APC. During large transient changes two (2) iteration loops, requiring approximately 25 ms total, may be required to converge to the desired second iteration APC 334 signal on a step change. This is approximately one fourth or less of the time (100 ms or greater) required for known approximation systems to generate a final APC by known iteration techniques.

In a following fifth step 338, final reference CAM and EGR positions are determined using the desired second iteration APC 334 signal. These lookups follow the same predetermined schedule used in the first iteration ICAM lookup table 324-1, ECAM lookup table 324-2 and EGR lookup table 324-3. The final CAM and EGR reference positions can be looked up and either commanded directly to the actuators or used as reference positions in a multivariable torque coordinator. Similar to the first iteration CAM reference positions, the second iteration CAM reference positions can be looked up in an ICAM lookup table 340-1, an ECAM lookup table 340-2 and an EGR lookup table 340-3 and either commanded directly to the CAM and EGR actuators or used as reference positions in a multivariable torque coordinator. The output from the ICAM lookup table 340-1, the ECAM lookup table 340-2 and the EGR lookup table 340-3 generate each of a reference intake cam position 342, a reference exhaust cam position 344, and a reference EGR opening area 346.

Throttle and wastegate reference positions are then determined. Similar to the CAM reference positions the waste gate and throttle reference positions can be looked up as a function of the desired APC, RPM and mode. The desired second iteration APC 334 signal is used to enter into a wastegate lookup table 348 to create a reference wastegate opening area 350. The desired second iteration APC 334 signal is also used to enter into a throttle lookup table 352 to create a reference throttle opening area 354.

A method to determine reference actuator positions for a gasoline engine of the present disclosure offers several advantages. These include the ability to find efficient actuator positions, the ability to compensate for spark efficiency without use of a slow iterative process, the ability to compensate for changing pumping losses to find the correct desired APC, and the present system and method minimizes computational resources, presenting a solution in a single loop or two loops of calculations.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method to determine reference actuator positions for a gasoline engine, including:
    identifying a base torque request as a last time loop execution of each of a CAM position, an exhaust gas recirculation (EGR) valve position and a predicted spark;
    applying an inverse torque model to the base torque request to generate a first iteration desired air per cylinder (APC) value;
    passing the first iteration APC value through a dead band filter to minimize oscillations, thereby defining a filtered APC value;
    entering multiple look-up tables with the filtered APC value, including:
        looking up a desired CAM position in a CAM position look-up table; and
        looking up a desired EGR valve position in an EGR valve position look-up table;
    calculating a Predicted As Cal (PAC) spark advance for the desired CAM position and the desired EGR valve position;
    generating a second iteration desired APC value by passing the PAC spark advance through a torque model translation; and
    entering an output of the torque model translation again into the CAM position look-up table and the EGR valve position look-up table.

2. The method to determine reference actuator positions for a gasoline engine of claim 1, further including determining a reference CAM position from the CAM position look-up table.

3. The method to determine reference actuator positions for a gasoline engine of claim 2, further including determining a reference EGR valve position from the EGR valve position look-up table.

4. The method to determine reference actuator positions for a gasoline engine of claim 3, further including directly commanding at least one actuator using the reference CAM position and the reference EGR valve position.

5. The method to determine reference actuator positions for a gasoline engine of claim 1, further including entering the output of the torque model translation into a wastegate lookup table to generate a reference wastegate position.

6. The method to determine reference actuator positions for a gasoline engine of claim 1, further including entering the output of the torque model translation into a throttle lookup table to generate a reference throttle position.

7. The method to determine reference actuator positions for a gasoline engine of claim 1, further including adding an air conditioner load during the identifying the base torque request step.

8. The method to determine reference actuator positions for a gasoline engine of claim 7, further including adding a generator load during the identifying the base torque request step.

9. The method to determine reference actuator positions for a gasoline engine of claim 1, further including applying constraints to the desired CAM position to obtain a constrained desired CAM position and applying constraints to the desired EGR valve position to obtain a constrained desired EGR valve position.

10. The method to determine reference actuator positions for a gasoline engine of claim 1, further including performing the calculating step using the constrained desired CAM position and the constrained desired EGR valve position.

11. A method to determine reference actuator positions for a gasoline engine, including:
    identifying a base torque request as a last time loop execution of each of a CAM position, an exhaust gas recirculation (EGR) valve position and a predicted spark;
    applying an inverse torque model to the base torque request to generate a first iteration desired air per cylinder (APC) value to approximate a desired APC value;
    passing the first iteration APC value defining the desired APC value through a dead band filter to minimize oscillations thereby defining a filtered APC value;
    entering multiple look-up tables with the filtered APC value, including:
        looking up a desired CAM position in a CAM position look-up table; and
        looking up a desired EGR valve position in an EGR valve position look-up table;
    applying constraints to the desired CAM position to obtain a constrained desired CAM position and to the desired EGR valve position to obtain a constrained desired EGR valve position;
    calculating a Predicted As Cal (PAC) spark advance for the constrained desired CAM position and the constrained desired EGR valve position;
    generating a second iteration desired APC value by passing the PAC spark advance through a torque model translation; and
    entering an output of the torque model translation into the CAM position look-up table and the EGR valve position look-up table.

12. The method for determining reference actuator positions for a gasoline engine of claim 11, further including determining a reference CAM position from the CAM position look-up table and directly commanding at least one actuator using the reference CAM position.

13. The method for determining reference actuator positions for a gasoline engine of claim 12, further including determining a reference EGR valve position from the EGR valve position look-up table and directly commanding at least one actuator using the reference EGR valve position.

14. The method for determining reference actuator positions for a gasoline engine of claim 11, further including determining a spark efficiency to assume for a translation from a torque APC to a desired APC.

15. The method for determining reference actuator positions for a gasoline engine of claim 14, further including applying the calculated Predicted As Cal (PAC) spark advance to determine a spark advance at an end of a spark event.

16. The method for determining reference actuator positions for a gasoline engine of claim 15, further including entering lookup tables to determine each of:
   a final reference intake cam position signal;
   a final reference exhaust cam position signal; and
   a final reference EGR position signal.

17. The method for determining reference actuator positions for a gasoline engine of claim 16, further including modifying the desired APC second iteration signal with data from at least one wastegate lookup table to create a reference wastegate position as a function of the desired APC value.

18. The method for determining reference actuator positions for a gasoline engine of claim 17, further including modifying the desired APC second iteration signal with data from at least one throttle lookup table to create a reference throttle position.

* * * * *